United States Patent
Schmidt et al.

(10) Patent No.: US 7,571,269 B2
(45) Date of Patent: Aug. 4, 2009

(54) COVERT CHANNEL FOR CONVEYING SUPPLEMENTAL MESSAGES IN A PROTOCOL-DEFINED LINK FOR A SYSTEM OF STORAGE DEVICES

(75) Inventors: Brian K. Schmidt, Mountain View, CA (US); James Gregory Hanko, Redwood City, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 308 days.

(21) Appl. No.: 11/314,162

(22) Filed: Dec. 20, 2005

(65) Prior Publication Data

US 2007/0180172 A1    Aug. 2, 2007

Related U.S. Application Data

(60) Provisional application No. 60/711,863, filed on Aug. 25, 2005.

(51) Int. Cl.
*G06F 13/42* (2006.01)
*G06F 13/38* (2006.01)
*G06F 13/36* (2006.01)
*G06F 3/00* (2006.01)

(52) U.S. Cl. .............................. 710/105; 710/5; 710/74; 710/315

(58) Field of Classification Search .................. 711/146; 710/105

See application file for complete search history.

(56) References Cited

U.S. PATENT DOCUMENTS

| | | | |
|---|---|---|---|
| 5,274,645 A | | 12/1993 | Idleman et al. |
| 6,735,650 B1 * | | 5/2004 | Rothberg ..................... 710/74 |
| 6,895,455 B1 * | | 5/2005 | Rothberg ..................... 710/74 |
| 7,167,929 B2 * | | 1/2007 | Steinmetz et al. .............. 710/5 |
| 7,200,698 B1 * | | 4/2007 | Rothberg ..................... 710/74 |
| 2004/0073747 A1 | | 4/2004 | Lu |

(Continued)

FOREIGN PATENT DOCUMENTS

EP    1811396    *    7/2007

(Continued)

OTHER PUBLICATIONS

"8029P057PCT ISR WO Mailed Sep. 28, 2007 for PCT/US06/32454", (Sep. 28, 2007), Whole Document.

(Continued)

*Primary Examiner*—Mark Rinehart
*Assistant Examiner*—Brian T Misiura
(74) *Attorney, Agent, or Firm*—Blakely Sokoloff Taylor & Zafman

(57) ABSTRACT

Disclosed are communication apparatus, a SATA communication device, a system, an enhanced port multiplier and a method for, among other things, establishing a covert communication channel in a protocol-compliant link. In one embodiment, a communication apparatus includes a link interface and a supplemental message interface. The link interface is configured to communicatively couple the communication apparatus to the link for accessing a data stream passing through the link in accordance with a standardized protocol. The supplemental message interface is configured to exchange a supplemental message within the data stream to establish a covert communication channel in the link. The supplemental message supplements the standardized protocol without violating the protocol.

16 Claims, 9 Drawing Sheets

U.S. PATENT DOCUMENTS

| | | | |
|---|---|---|---|
| 2004/0098645 | A1 | 5/2004 | Beckett et al. |
| 2004/0177218 | A1 | 9/2004 | Meehan et al. |
| 2005/0005044 | A1 | 1/2005 | Liu et al. |
| 2005/0114464 | A1 | 5/2005 | Amir et al. |
| 2006/0101203 | A1 | 5/2006 | Yanagisawa |
| 2006/0230218 | A1* | 10/2006 | Warren et al. ............... 710/315 |
| 2006/0242312 | A1* | 10/2006 | Crespi et al. ................ 709/230 |
| 2007/0050538 | A1* | 3/2007 | Northcutt et al. ............ 711/112 |

FOREIGN PATENT DOCUMENTS

| | | | |
|---|---|---|---|
| JP | 2007179549 | * | 7/2007 |

OTHER PUBLICATIONS

USPTO, "8029P057 FOA Mailed Nov. 20, 2008 for U.S. Appl. No. 11/510,254", (Nov. 20, 2008), Whole Document.

USPTO, "8029P057 OA Mailed Apr. 30, 2008 for U.S. Appl. No. 11/510,254", (Apr. 30, 2008), Whole Document.

USPTO, "8029P057 OA Mailed Aug. 17, 2007 for U.S. Appl. No. 11/510,254", (Aug. 17, 2007), Whole Document.

USPTO, "8029P057 OA Mailed Apr. 24, 2009 for U.S. Appl. No. 11/510,254", (Apr. 24, 2009), Whole Document.

* cited by examiner

COVERT CHANNEL FOR CONVEYING SUPPLEMENTAL MESSAGES IN A PROTOCOL-DEFINED LINK FOR A SYSTEM OF STORAGE DEVICES

CROSS REFERENCE TO RELATED APPLICATION

This application incorporates by reference U.S. Provisional Application No. 60/711,863, entitled "Smart Scalable Storage Switch Architecture" and filed on Aug. 25, 2005.

BRIEF DESCRIPTION OF THE INVENTION

This invention relates generally to storage devices, and more particularly, to an apparatus for establishing a covert communication channel in a link, such as a Serial Advanced Technology Attachment ("SATA") link, for a system of storage devices.

BACKGROUND OF THE INVENTION

Storage system architects typically use standardized communication protocols, at least in part, to minimize the technical expertise and capital expenditures required to develop storage products. Standardized communications protocols also provide a vehicle to set benchmarks for performance and quality. But strict adherence to rigid protocol standards can retard innovation when improvements are unsupportable by the standardized protocol. To illustrate, consider that the Serial Advanced Technology Attachment ("SATA") specification has been developed for standardizing the transfer of data to and from one or more storage devices (e.g., one or more hard disks). The SATA specification provides users with enhanced performance and reliability, as well as techniques for easily upgrading storage devices. Further, the SATA specification defines the use of port multipliers so that a single SATA port can communicate with multiple drives. While functional, the SATA specification does not provide the flexibility to establish a communications channel between a host computer and any point within a system of storage devices, such as at a port multiplier, for performing storage-related functions that are not supported by the SATA specification. Without a communication channel for transferring commands into the system of storage devices for performing storage-related functions, the host computer is required to implement those storage-related functions. Hence, the host computer would not benefit from the enhanced performance or reliability features provided by SATA.

In view of the foregoing, it would be desirable to provide a communication apparatus, a SATA communication device, a system, an enhanced port multiplier and a method that minimize the drawbacks of standardized communications protocols, such as the SATA protocol.

SUMMARY OF THE INVENTION

Disclosed are a communication apparatus, a SATA communication device, a system, an enhanced port multiplier and a method for, among other things, establishing a covert communication channel in a protocol-compliant link. In one embodiment, a communication apparatus includes a link interface and a supplemental message interface. The link interface is configured to communicatively couple the communication apparatus to the link for accessing a data stream passing through the link in accordance with a standardized protocol. The supplemental message interface is configured to exchange a supplemental message with the data stream to establish a covert communication channel in the link. The supplemental message supplements the standardized protocol without violating the protocol.

Advantageously, the covert communication channel communicates supplemental messages without affecting or disrupting the protocol-compliant link and its ability to convey protocol-compliant messages between endpoint devices, which can include a host computing device and any storage devices. No modifications thus are necessary to the protocol-compliant devices to form the covert communication channel. Also, the covert communication channel advantageously enables a system of storage devices to perform enhanced storage-related functions rather than at a host computing device. Not only does this preserve computational resources of a host computing device, it also obviates the need for the host computing device to include specialized programs for performing enhanced storage-related functions. In particular, no special operating system or device driver is required to implement enhanced storage-related functions (i.e., standard, non-proprietary user applications are sufficient). In one embodiment, the supplemental message can convey a supplemental command to any point downstream from the host computing device to perform enhanced storage-related functions, such as striping functions, mirroring functions, concatenating functions, enclosure management functions, firmware upgrade functions, administrative policy functions, and any other like storage-related functions.

Disclosed too is a SATA communication device for communicating non-SATA messages via a SATA link between a host and a storage device. The SATA communication device includes a SATA transceiver, which is configured to at least retrieve non-SATA messages from SATA messages associated with a first SATA-compliant command. The SATA transceiver can also insert non-SATA messages into SATA messages associated with a second SATA-compliant command. In one embodiment, the SATA transceiver sends non-SATA messages by encoding them within compliant SATA messages. As such, the SATA transceiver is operative to form a covert communication channel for conveying the non-SATA messages between the SATA communication device and the host. Advantageously, the covert communication channel is configured to simultaneously transport at least one non-SATA message via the SATA link with at least one SATA-compliant message without violating the SATA specification.

Disclosed further is an enhanced port multiplier that performs enhanced storage-related functions for a system of SATA-compliant storage devices. The enhanced port multiplier includes a SATA transceiver configured to form a covert communication channel. This channel conveys non-SATA messages between the enhanced port multiplier and a host. The enhanced port multiplier also includes a non-SATA message execution unit configured to execute non-SATA commands in the non-SATA messages. As such, the enhanced port multiplier can perform an enhanced storage-related function within the system of SATA-compliant storage devices. In various embodiments, the enhanced port multiplier can also communicate with other enhanced port multipliers as well as encrypt non-SATA messages.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION OF EXEMPLARY EMBODIMENTS

Figure 1:
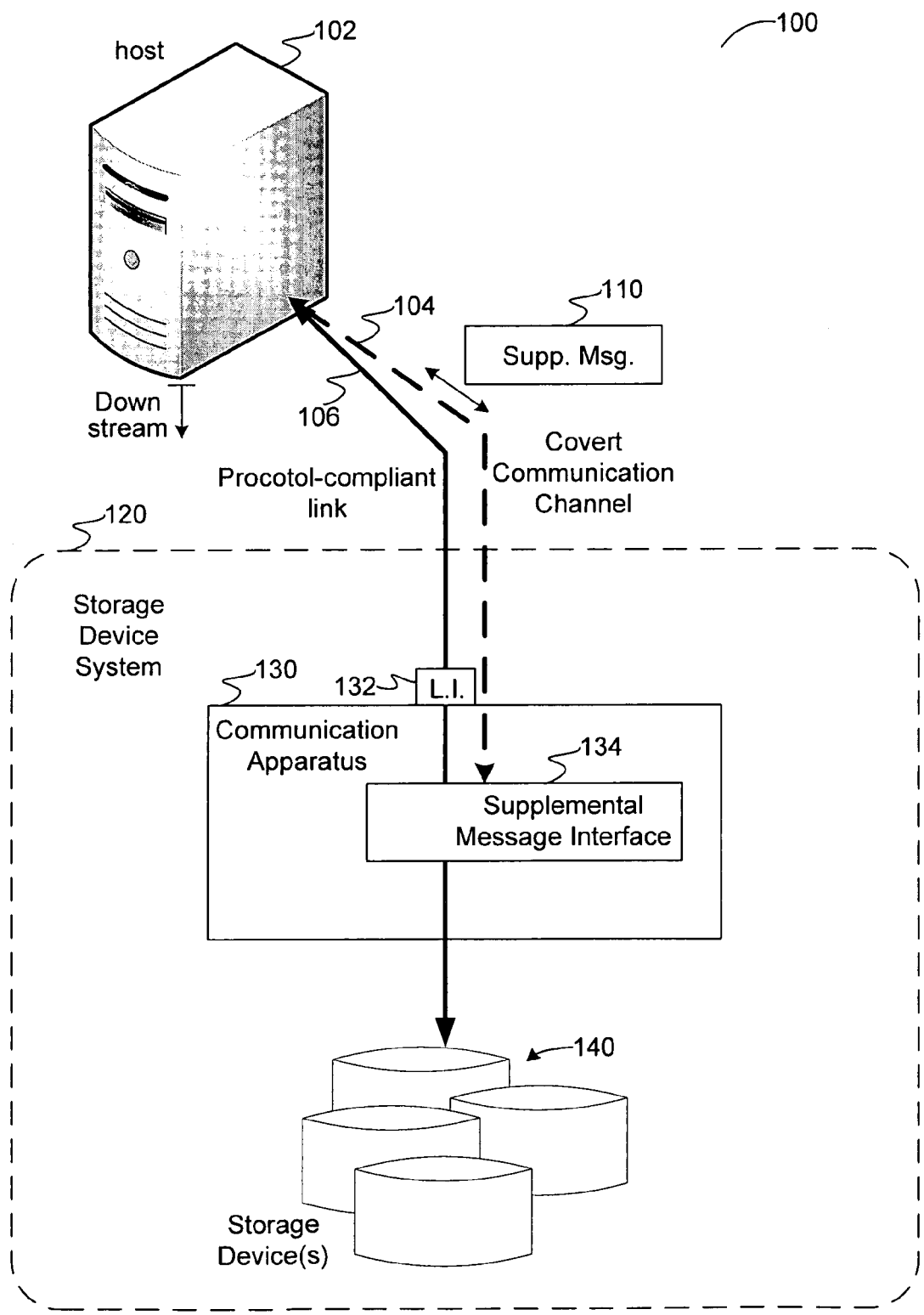
FIG. 1 is a block diagram of a communication apparatus for establishing a covert communication channel, according to at least one specific embodiment of the invention.

FIG. 1 is a block diagram 100 of a communication apparatus for establishing a covert communication channel, according to at least one specific embodiment of the invention. Conceptually, communication apparatus 130 establishes a covert communication channel 104 for conveying supplemental messages ("Supp. Msg.") 110 via a protocol-compliant link 106 between a host bus adapter (not shown) of a host computing device ("host") 102 and any point within a system 120 ("storage device system") of storage devices 140. Supplemental message 110 is a noncompliant message that is undefined by the protocol underpinning protocol-compliant link 106. For example, supplemental message 110 can have a format, a mode of transmission or a function that is undefined by the protocol. As such, supplemental message 110 "supplements" or augments the particular protocol to provide enhanced functionality. Accordingly, the term "covert," as used herein, can refer to a communication channel superimposed on a protocol-compliant link 106 for purposes of transferring noncompliant messages between protocol-compliant devices.

Advantageously, covert communication channel 104 communicates supplemental message 110 without affecting or disrupting protocol-compliant link 106 and its ability to convey protocol-compliant messages between endpoint devices, which can include host computing device 102 and any of storage devices 140. Thus, no modifications are necessary to the protocol-compliant devices to form covert communication channel 104. Also, covert communication channel 104 advantageously enables a system of storage devices 120 to perform enhanced storage-related functions rather than at host computing device 102. Not only does this preserve computational resources of host computing device 102, it also obviates the need for host computing device 102 to include specialized programs for performing enhanced storage-related functions. In particular, no special operating system or device driver is required to implement enhanced storage-related functions (i.e., standard, non-proprietary user applications are sufficient). In one embodiment, supplemental message 110 can convey a supplemental command to any point downstream from host computing device 102 for performing storage-related functions. Such messages also can be forwarded to additional devices using the same or a different protocol. Examples of enhanced storage-related functions include striping functions, mirroring functions, concatenating functions, enclosure management functions, firmware upgrade functions, administrative policy functions, and any other like storage-related functions.

As shown in FIG. 1, protocol-compliant link 106 couples host computing device 102 to storage devices 140 to perform nominal storage functions defined by a protocol. Examples of storage devices 140 include one or more hard disk drives and any medium in which to store data using mechanical, magnetic, electrical or optical means. Diagram 100 shows communication apparatus 130 forming a terminus for covert communication channel 104. Communication apparatus 130 includes a link interface ("L.I.") 132 and a supplemental message interface 134. Link interface 132 communicatively couples communication apparatus 130 to protocol-compliant link 106 for accessing a data stream passing through protocol-compliant link 106 in accordance with a standardized protocol. Supplemental message interface 134 is operable to exchange one or more supplemental messages 110 with the data stream to establish covert communication channel 104 in protocol-compliant link 106. Notably, covert communication channel 104 embeds supplemental messages 110 in the data stream in a manner that protocol-compliant link 106 remains in compliance with the associated standardized protocol. In one embodiment, protocol-compliant link 106 is a serial link. While in some embodiments communication apparatus 130 can be disposed on a backplane (not shown) of host computing device 102, communication apparatus 130 can be located at any location within system 120 of storage devices 140 in accordance with other embodiments of the invention. In various embodiments of the invention, host computing device 102 includes another supplemental message interface 134 (or an equivalent thereof) to form either unidirectional or bidirectional data streams between communication apparatus 130 and host computing device 102.

Figure 2:
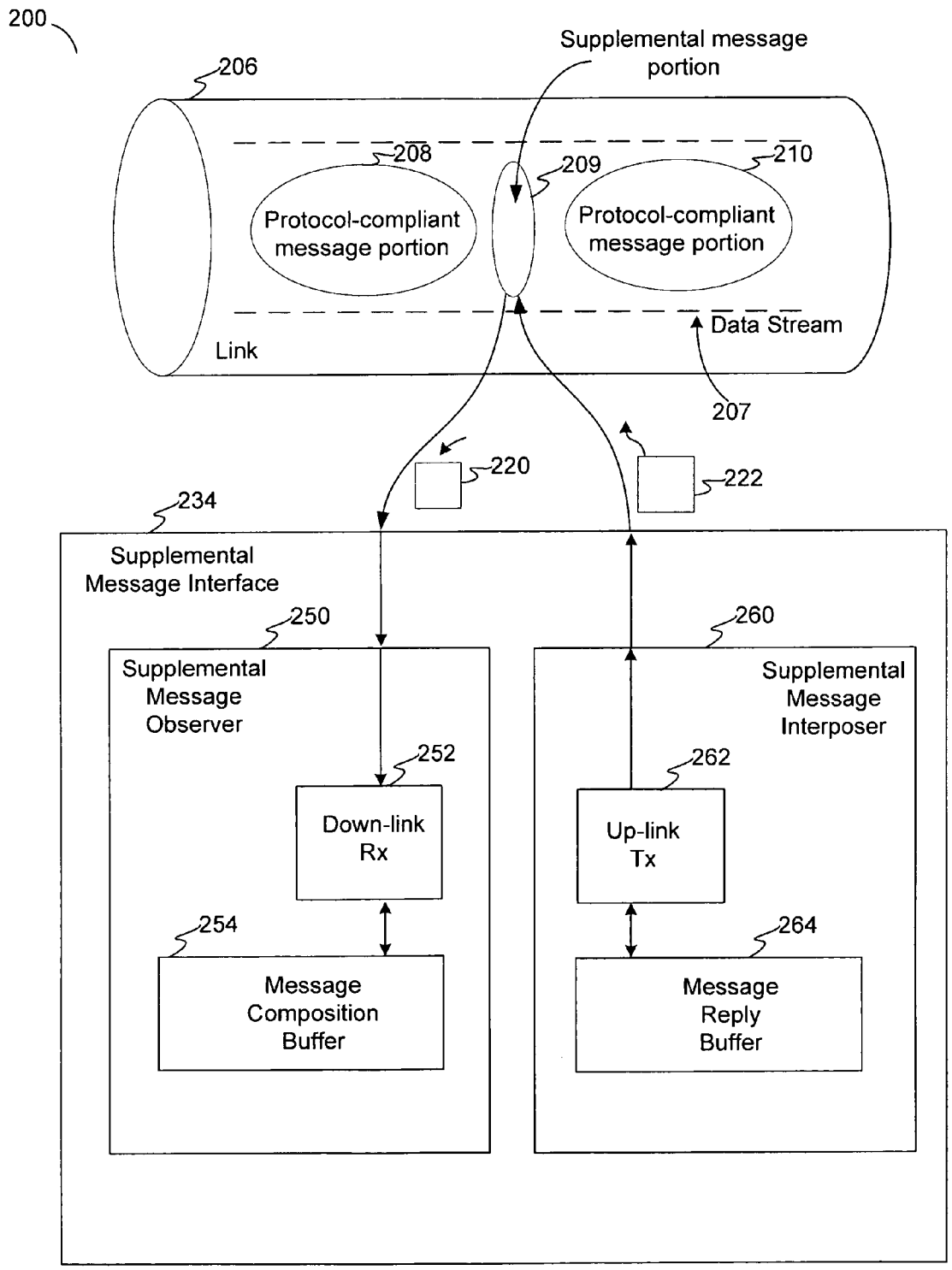
FIG. 2 is a diagram showing a specific implementation of a supplemental message interface of FIG. 1, according to an embodiment of the invention.

FIG. 2 is a diagram 200 showing a specific implementation of supplemental message interface 134 of FIG. 1, according to an embodiment of the invention. Diagram 200 shows supplemental message interface 234 being configured to exchange supplemental messages (or portions thereof) with a data stream 207 in a protocol-compliant link 206. In this illustration, supplemental message interface 234 is operable to observe or "eavesdrop" on data stream 207 to identify a supplemental message portion 209 in relation to protocol-compliant message portions 208 and 210. Supplemental message interface 234 then can acquire supplemental message portion 209 as an identified supplemental downlink message 220 (or portion thereof). Supplemental message interface 234 is also operable to interpose supplemental uplink message 222 (or a portion thereof) between protocol-compliant message portions 208 and 210 to form supplemental message portion 209. Note that protocol-compliant message portions 208 and 210 can be of the same or different protocol-compliant messages. In various embodiments, the acquisition of supplemental messages by supplemental message interface 234 does not affect protocol-compliant link 206. Data stream 207 therefore can pass through or by supplemental message interface 234 without alteration, and without violating the particular protocol of protocol-compliant link 206.

In at least one embodiment, protocol-compliant link 206 implements a protocol having READ, WRITE and/or IDENTIFY semantics. In such a protocol, a READ command is used to read data from a storage device and, for example, specifies a disk address, length and other information. A WRITE command is used to store data onto a storage device and can specify a disk address, a length, and the data to be stored. An IDENTIFY command is used to identify the particulars of a storage device and can query a storage device for its serial number, model number, type, capabilities, and other like information.

Supplemental message interface 234 includes a supplemental message observer 250 and a supplemental message interposer 260. Supplemental message observer 250 includes a downlink receiver ("Rx") 252 and a message composition buffer 254. Downlink receiver 252 is configured to observe or eavesdrop on data stream 207 to detect supplemental message portion 209. Notably, downlink receiver 252 can monitor data stream 207 and then can acquire supplemental message portion 209 (e.g., such as a copy thereof) without modifying or disturbing either data stream 207. Data stream 207 thus passes unaltered to downstream devices without violating the protocol of protocol-compliant link 206. In a specific embodiment, downlink receiver 252 is operable to detect one type of protocol-compliant message in data stream 207. Once that one type is detected, downlink receiver 252 scans data stream 207 to identify supplemental message portion 209, after which identified supplemental downlink message 220 can be acquired. In one embodiment, the one type of protocol-compliant message is any "READ" command that typically is used to read information from a storage device. READ commands are particularly useful in communicating supplemental messages because the protocol-compliant messages that contain such commands will not alter the downstream storage devices. Message composition buffer 254 is coupled to downlink receiver 252 to acquire portions of identified supplemental downlink messages 220 from which it composes an entire supplemental message.

Supplemental message interposer 260 includes an uplink transmitter ("Tx") 260 and a message reply buffer 264. Message reply buffer 264 maintains a supplemental response message (or a portion thereof) that includes requested data generated by another type of protocol-compliant message. Uplink transmitter 262 is operable to interpose a portion of the supplemental response message as supplemental uplink message 222 between protocol-compliant message portions 208 and 210 to form supplemental message portion 209. In particular, uplink transmitter 262 fetches supplemental uplink message 222 from message reply buffer 264 and then sends it to a host computing device, for example. In a specific embodiment, uplink transmitter 262 operates in response to the other type of protocol-compliant message. In one embodiment, the other type of protocol-compliant message is a non-write command that returns a response message. One such non-write command is an IDENTIFY DEVICE command.

Figure 3:
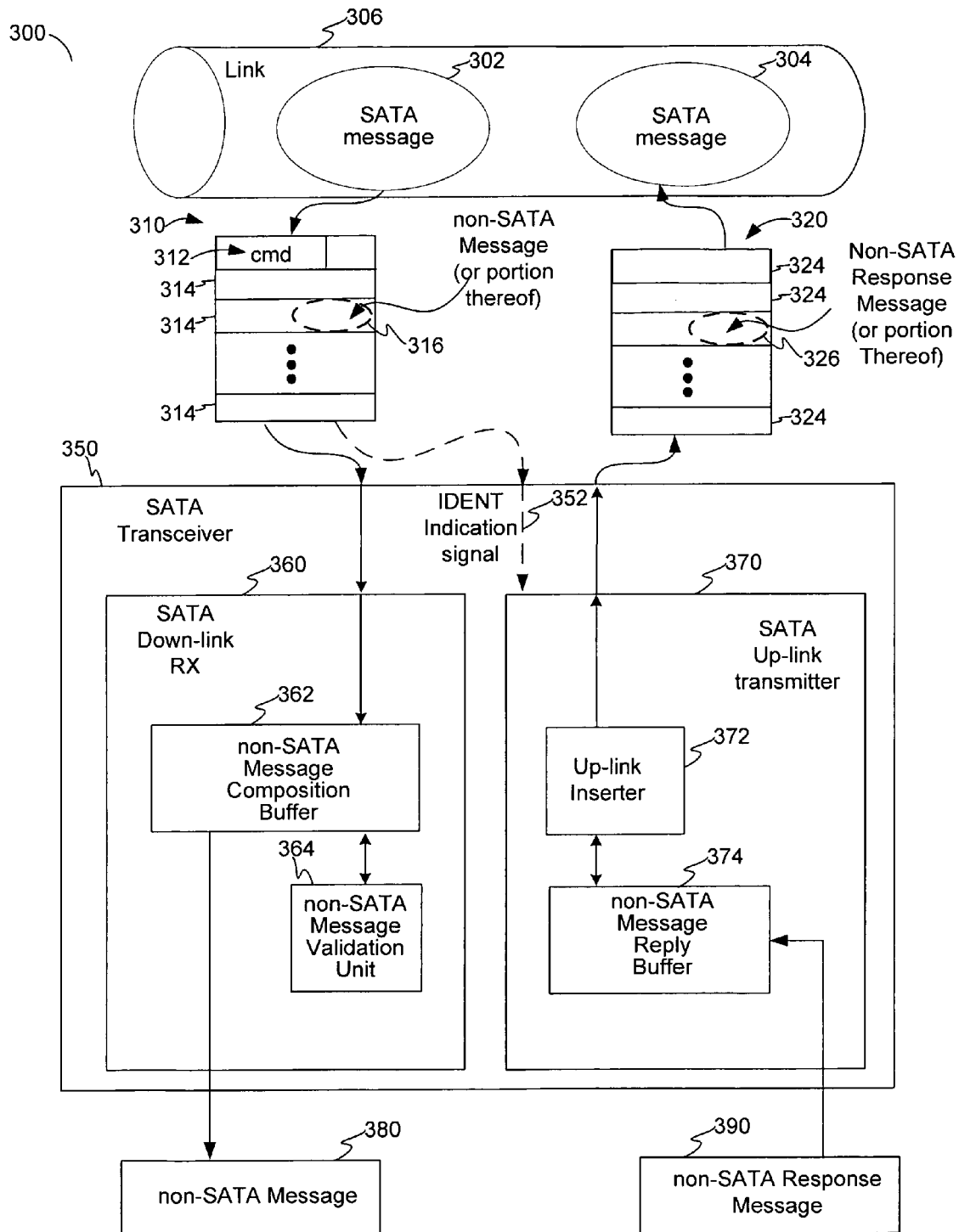
FIG. 3 is a diagram showing a Serial Advanced Technology Attachment ("SATA") transceiver for establishing a covert communication channel in a link compliant with the SATA specification, according to an embodiment of the invention.

FIG. 3 is a diagram 300 showing a Serial Advanced Technology Attachment ("SATA") transceiver for establishing a covert communication channel in a link compliant with the SATA specification, according to an embodiment of the invention. Diagram 300 depicts a SATA transceiver 350 for communicating non-SATA messages via a SATA link 306 between a host computing device and a storage device, both of which are not shown. In particular, SATA transceiver 350 includes a SATA downlink receiver ("Rx") 360 and a SATA uplink transmitter ("Tx") 370. SATA downlink receiver 360 is configured to retrieve non-SATA messages from SATA messages 302 that are associated with a first SATA-compliant command. By contrast, SATA uplink transmitter 370 is configured to insert non-SATA messages into SATA messages 304 that are associated with a second SATA-compliant command. Accordingly, SATA transceiver 350 is operative to form a covert communication channel for conveying non-SATA messages between either SATA transceiver 350 or a SATA communication device and a host computing device (not shown). The covert communication channel thus can simultaneously transport at least one non-SATA message (or a portion thereof) via SATA link 306 with at least one of SATA messages 302 and 304. For example, non-SATA message 316 (or a portion thereof) can simultaneously traverse link 306 with SATA message 302, whereas non-SATA message 326 (or a portion thereof) can simultaneously traverse link 306 with SATA message 304. SATA message 302 and SATA message 304 are a downlink message from a host computing device and an uplink message bound for the host computing device, respectively. Note that the term "SATA" refers to a protocol set forth by the Serial ATA International Organization ("SATA-IO") of Portland, Oreg., in a SATA specification.

As shown in FIG. 3, SATA downlink receiver 360 includes a non-SATA message composition buffer 362 and a non-SATA message validation unit 364 for generating a non-SATA message 380. In one embodiment, the above-described first SATA-compliant command is a READ command and the above-described second SATA-compliant command is an IDENTIFY DEVICE command. Further, SATA message 302 can be composed of one or more SATA packets 310, each of which includes a number of fields 314 as set forth by the SATA specification. In operation, SATA downlink receiver 360 functions to detect the first SATA-compliant command as a READ command in a command field 312. Then, SATA downlink receiver 360 retrieves at least a portion 316 of a message field 314 from SATA packet 310. In a specific embodiment, portion 316 of message field 314 can be a part of, for example, a logical block address ("LBA"). Non-SATA message composition buffer is configured to accumulate portions 316 of message field 314 to compose an entire non-SATA message 380. Non-SATA message validation unit 364 is configured to validate that non-SATA message 380 is a valid. In some embodiments, the term SATA packet 310 generally refers to a Frame Information Structure ("FIS").

Further to FIG. 3, SATA uplink transmitter 370 includes an uplink inserter 372 and a non-SATA message reply buffer 374, both of which are used to introduce non-SATA response message into link 306. SATA message 304 can be composed of one or more SATA packets 320, each of which includes a number of fields 324 that are defined by the SATA specification. In operation, SATA uplink transmitter 370 detects receipt of a SATA-compliant command as an IDENTIFY DEVICE command in a command field 312. Then, SATA uplink transmitter 370 responds by inserting at least a portion of a non-SATA response message 390 into a message field 326. In a specific embodiment, message field 326 (or a portion thereof) can be, for example, a vendor-specific field. Non-SATA message reply buffer 374 is configured to maintain at least a portion of non-SATA response message 390. Non-SATA message reply buffer 374 releases the portion of non- SATA response message 390 to uplink inserter 372 in response to SATA transceiver 350 receiving another SATA message that includes an IDENTIFY DEVICE command. For example, the receipt of the other SATA message can generate an IDENTIFY DEVICE ("IDENT") receipt indication signal 352, which activates uplink inserter 372. Note that the SATA specification itself inherently limits SATA uplink transmitter 370 such that is cannot asynchronously transmit non-SATA response message 390. As such, the host "requests" non-SATA response message 390 by sending IDENTIFY DEVICE commands in SATA messages 302. Once received at SATA transceiver 350, IDENTIFY DEVICE ("IDENT") receipt indication signal 352 is triggered to initiate the interposition of portions of non-SATA response message 390.

Figure 4:
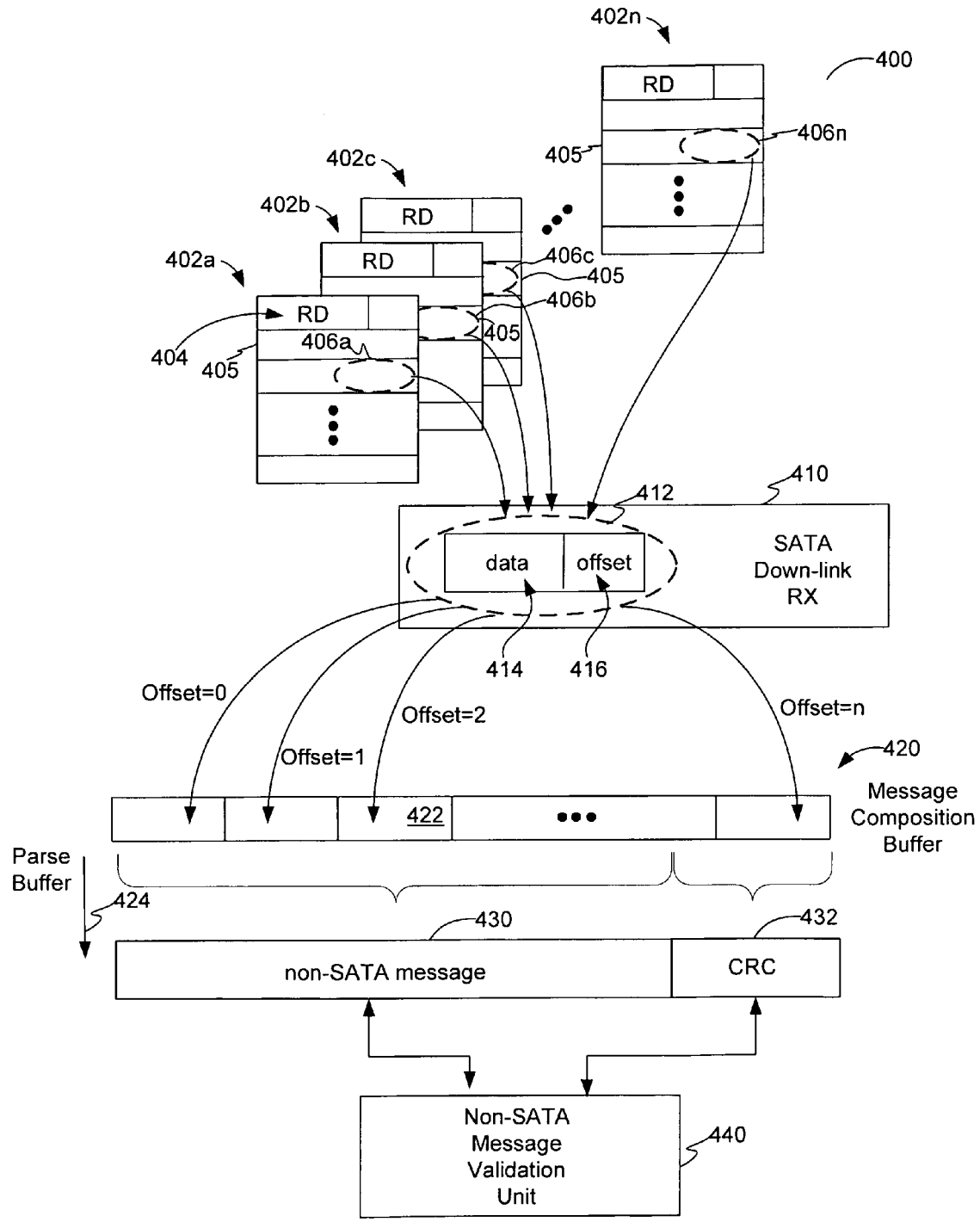
FIG. 4 is a functional diagram depicting a SATA downlink receiver for establishing a downlink for a covert communication channel, according to a specific embodiment of the invention.

FIG. 4 is a functional diagram 400 depicting the functionality of a SATA downlink receiver for establishing a downlink for a covert communication channel, according to a specific embodiment of the invention. In particular, SATA downlink receiver ("Rx") 410 forms a unidirectional link from a host computing device to a SATA transceiver (not shown) by acquiring non-SATA messages from a SATA link. In the example shown, SATA downlink receiver 410 "eavesdrops" on SATA packets to detect a READ ("RD") command in a command field 404 for each of SATA packets 402a to 402n. In this instance, the SATA FIS is passed intact (i.e., without modifying the protocol-compliant message) to one or more downstream devices, such as storage devices. Then, SATA downlink receiver 410 acquires (i.e., captures or copies) portions of a non-SATA message from, for example, portions 406a to 406n in a message field 405 without affecting the transportation of SATA packets 402a to 402n from the host computing device (not shown) to their destinations (i.e., to storage devices). In one embodiment, message field 405 is a logical block address ("LBA") specifying an area on a disk from which to read data. Note that message field 405 can contain the various sizes of logical block addresses that are supported by the SATA specification.

In one instance, message field 405 contains a 48-bit LBA, with two bytes (e.g., 16 bits) used to specify a portion of a 512-byte message body for a non-SATA message. Another single byte (e.g., 8 bits) from message field 405 can specify an offset from 0 to 255 for positioning the two bytes within a message composition buffer 420. In one embodiment, SATA downlink receiver 410 operates to identify 16 bits as data 414 in portion 412 from any of SATA packets 402a to 402n. It also identifies 8 bits of portion 412 as an associated offset 416. Thus, a host computing device (not shown) can communicate any arbitrary non-SATA message to SATA downlink receiver 410 by sending small pieces (e.g., one or two bytes) of it during each READ command transmitted downstream to a system of storage devices. In particular, the non-SATA messages can be encoded into the logical block address, or LBA. To illustrate, consider that SATA downlink receiver 410 acquires portion 406c as portion 412. Further, consider that offset 416 is "two." Thus, SATA downlink receiver 410 would deposit data 414 at position 422 of message composition buffer 420. While SATA downlink receiver 410 can populate message composition buffer 420 by using offsets in any order to compose a non-SATA message, in one embodiment non-SATA message is formed whenever the last byte of the composition buffer is written.

After message composition buffer 420 is full (or otherwise meets some other criterion), then SATA downlink receiver 410 parses buffer at 424 to realize a non-SATA message 430 and an optional verification value ("CRC") 432. Since READ commands from other SATA packets can intermingle with SATA packets 402a to 402n during transit, a random sequence of READ requests from the host can inadvertently generate an executable, but improper non-SATA message 430. While an improper non-SATA message 430 can corrupt a disk when executed, such a message can also lead to less catastrophic results. For example, an improper message could perform an inappropriate action when executed, such as creating a wrong storage device configuration or setting a bad policy. Non-SATA message validation unit 440 operates to invalidate non-SATA messages 430 that are improper. In the example shown, verification value 432 is a CRC value generated by a Cyclic Redundancy Check ("CRC") algorithm at the host prior to transmission. The CRC value as verification value 432 validates the integrity of message 430 to ensure that improper non-SATA messages 430 are not used. Non-SATA message validation unit 440 is operable to compute a CRC from non-SATA message 430 and to compare the result to CRC 432, where matches between the two indicate a validly sent message 430. In a specific embodiment, a 32-bit CRC is used to reduce the likelihood that a random set of READ requests yields an erroneous but seemingly valid packet to be sufficiently improbable as to be considered impossible for a specific application.

In another embodiment, the probability of unintentionally creating a sequence of READ requests yielding an improper valid message can be reduced by employing a challenge-response technique. In this case, SATA downlink receiver 410 includes a challenge uplink (not shown). When SATA downlink receiver 410 forms a valid non-SATA message 430, it places a challenge token in a non-SATA response message, such as that of FIG. 3, indicating the successful reception of non-SATA message 430. The host then responds with another non-SATA message 430 with a known response to the challenge token, thereby validating the original non-SATA message 430.

Note that calculating CRC 420 can consume an undesirable amount of time in some applications. In one embodiment, non-SATA message 430 includes a specific signature for detection by non-SATA message validation unit 440. If the exact value of the signature is not present, then CRC 432 need not be calculated, thus saving time that otherwise is used to calculate a CRC for an invalid message. Note that in at least one embodiment, message composition buffer 420 is locked during the processing of non-SATA message 430 so that incoming READ requests do not overwrite non-SATA message 430. Once the non-SATA message body has been processed, message composition buffer 420 is cleared so that a new message can be composed from a known state. In an alternative embodiment, message composition buffer 420 includes a queue containing any number of message composition buffers 420 (not shown) each having a similar structure and/or functionality. When one of message composition buffers 420 becomes full with a valid message, it can be processed while another message composition buffer 420 is being filled. The queue depth is application-specific and determines the maximum number of outstanding messages. For example, a queue depth of either one or two such buffers is often sufficient for storage-related applications.

Figure 5:
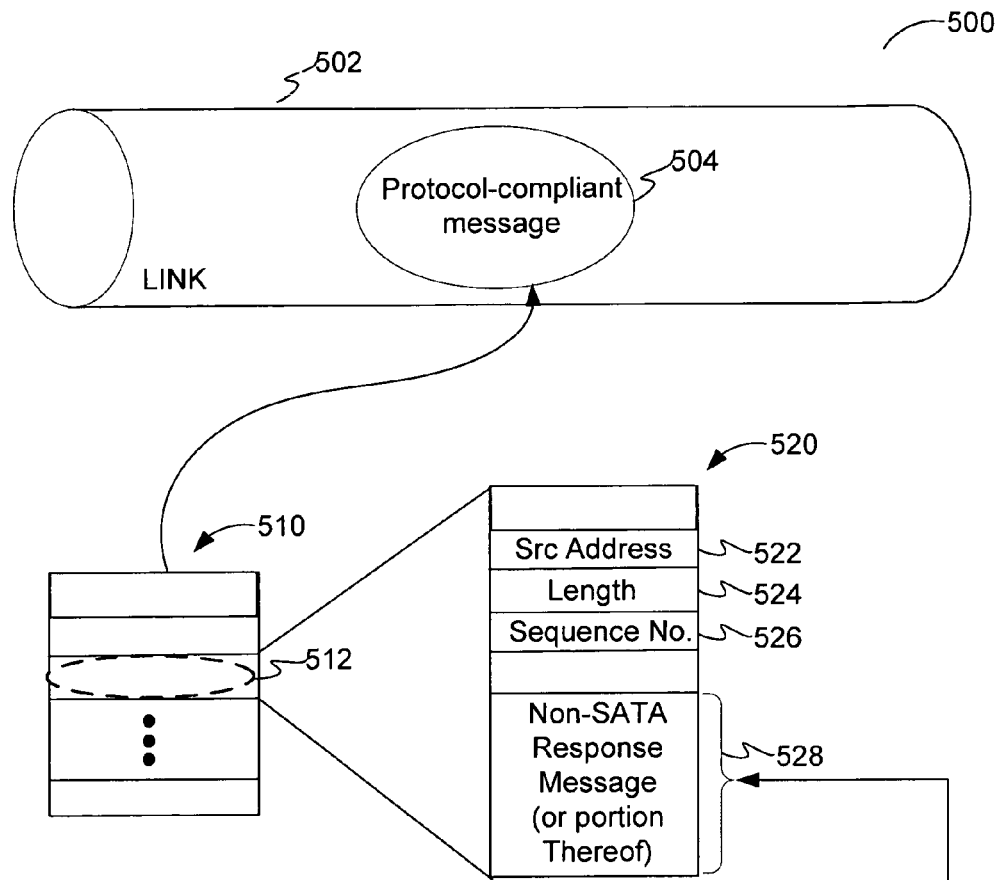
FIG. 5 is a functional diagram depicting a SATA uplink transmitter for establishing an uplink for a covert communication channel, according to a specific embodiment of the invention.
Figure 5:
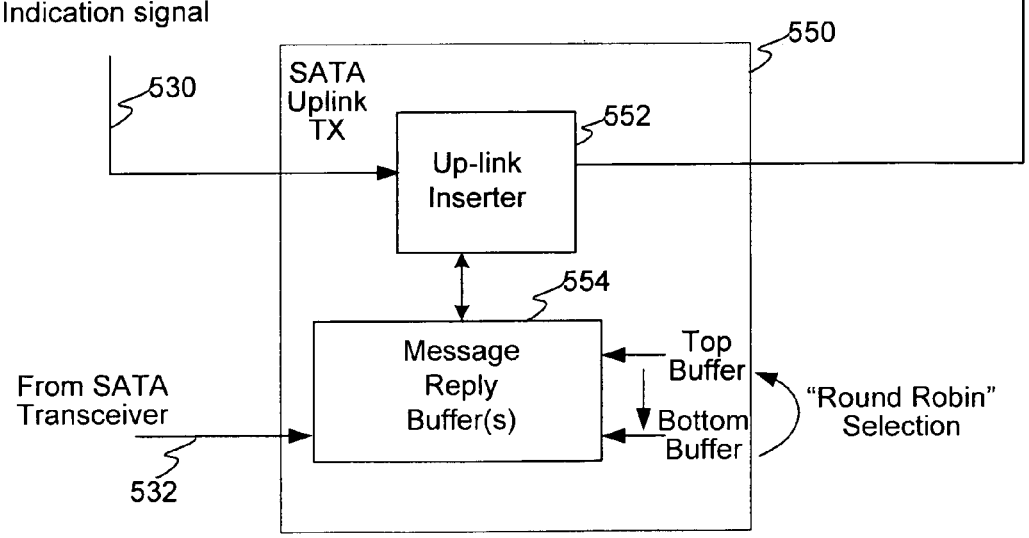

FIG. 5 is a functional diagram 500 depicting the functionality of a SATA uplink transmitter for establishing an uplink for a covert communication channel, according to a specific embodiment of the invention. In particular, SATA uplink transmitter ("Tx") 550 forms a unidirectional link from SATA uplink transmitter 550 (and/or a storage device) to a host computing device by inserting non-SATA messages into a SATA link 502. In the example shown, SATA uplink transmitter 550 does not asynchronously transmit a non-SATA response messages. Rather, uplink inserter 552 of SATA uplink transmitter 550 inserts a non-SATA response message (or a portion thereof) in response to receiving an IDENTIFY DEVICE command indication signal 530. Note that this signal is responsive to the receipt of an IDENTIFY DEVICE command that is subsequent to an earlier IDENTIFY DEVICE command that causes formation of the subject non-SATA response message. In one embodiment, logic in either a SATA transceiver or a SATA downlink receiver can generate signal 530. To receive responses (i.e., non-SATA response messages), a host generates SATA messages that include an IDENTIFY DEVICE command, which is generally used to query the nature and capabilities of an endpoint device, such as a storage device. The response to the IDENTIFY DEVICE command is a SATA response message ("protocol-compliant message") 504 modified (or synthesized) by uplink inserter 552 to include a non-SATA response message (or portion thereof) before propagating the message to the host.

In operation, a SATA transceiver loads one of a number of message reply buffers 554 with a non-SATA response message (or portion thereof) 532. But since SATA uplink transmitter is synchronous with the receipt of an IDENTIFY DEVICE command, the non-SATA response message stays in a buffer until an IDENTIFY DEVICE command is received. Once received, uplink inserter 552 fetches the next non-SATA response in message reply buffers 554. In one embodiment, a "top" buffer and a "bottom" buffer are designated in message reply buffer(s) 554, and uplink inserter 552 fetches data from the buffers in a "round robin" fashion (i.e., from top to bottom, returning back to the top). In this way, a host can collect a complete complement of non-SATA response messages, or portions thereof, (along with status information in SATA messages 504) by repeatedly sending SATA packets with an IDENTIFY DEVICE command. In a specific embodiment, uplink inserter 552 inserts non-SATA response messages, or portions thereof, into an available field 512 of a SATA packet 510. SATA packet 510 can constitute a SATA response message. that follows the execution of the IDENTIFY DEVICE command. Available field 512 can be a field for including vendor-specific field data 520, which, in turn, can include status information and a non-SATA response message (or portion thereof) 528. Examples of information that could be contained in a response message include a source address ("Src Address") 522, a length 524, a sequence number ("No.") 526, as well as other status information, such as the type of information that vendor-specific field data 520 contains, revision information, environmental data (e.g., ambient temperature of storage device), virtual drive configurations, physical drive configurations, performance statistics, response messages from downstream devices that are communicating over the covert channel, and the like. In a specific embodiment, SATA packet 510 is a 512-byte packet and available field 512 is a 62-byte field that is generally reserved for vendor-specific information. In one embodiment, vendor-specific field data 520 is referred to as a "status page" used to facilitate enhanced storage-related functions and/or virtualization downstream of a host.

Figure 6:
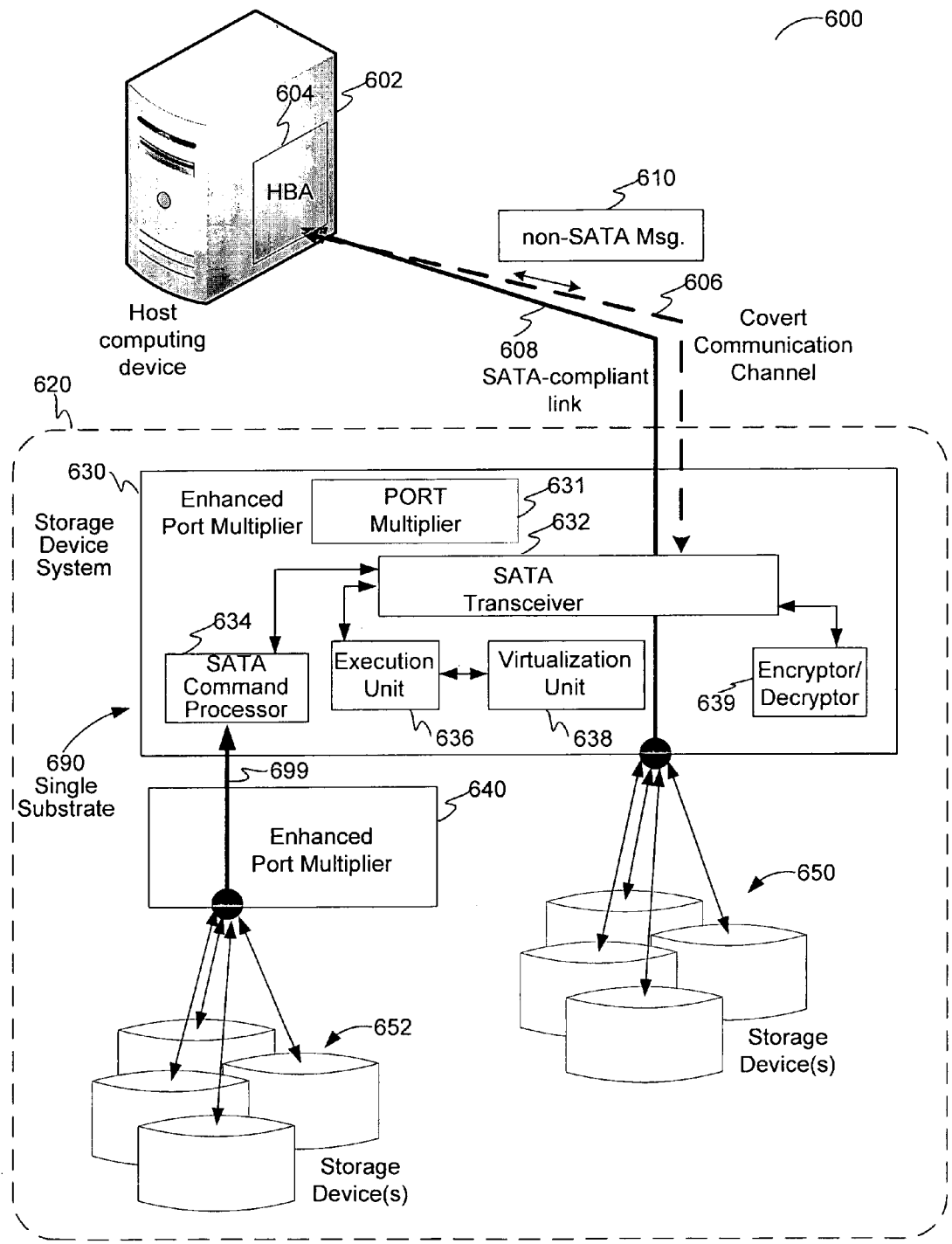
FIG. 6 is a block diagram of an enhanced port multiplier that performs enhanced storage-related functions for a system of SATA-compliant storage devices, according to at least one specific embodiment of the invention.

FIG. 6 is a block diagram 600 of an enhanced port multiplier that performs enhanced storage-related functions for a system of Serial Advanced Technology Attachment ("SATA")-compliant storage devices, according to at least one specific embodiment of the invention. Conceptually, SATA transceiver 632 establishes a covert communication channel 606 for conveying a non-SATA message ("non-SATA Msg.") 610 via a SATA-compliant link 608 between a host bus adapter ("HBA") 604 of a host computing device 602 and any point at which enhanced port multiplier 630 resides within a system of storage devices ("storage device system") 620. Non-SATA message 610 is a noncompliant message that "supplements" or augments the functionality of SATA. A noncompliant message is one that is undefined by the SATA protocol. In some embodiments, host bus adapter 604 can be any input/output ("I/O") device for adapting data transfers between an internal bus of a host computing device and a bus or link associated with one or more storage devices.

Enhanced port multiplier 630 includes a port multiplier 631, which is a fan-out device that enables one SATA port of host computing device 602 to connect to multiple SATA drives. Enhanced port multiplier 630 is transparent to storage devices 650 and 652 and allows these devices to function as if they were directly attached to host bus adapter 604. The general functionality and structure of port multiplier 631 is known and need not be discussed further. Enhanced port multiplier 630 also includes SATA transceiver 632, an optional SATA command processor 634, an execution unit 636, an optional virtualization unit 638, and an optional encryptor/decryptor 639. Execution unit is configured to execute non-SATA commands identified by SATA transceiver 632 to perform an enhanced storage-related function within system 620 of SATA-compliant storage devices. Advantageously, execution unit 636 obviates a requirement by host computing device 602 to execute instructions in system memory to perform an enhanced storage-related function, such as striping functions, mirroring functions, concatenating functions, and the like, on a virtual representation of storage devices 650 and 652.

Enhanced port multiplier 630 can include a virtualization unit 638 for providing a virtual representation of system 620 of SATA-compliant storage devices, such that host computing device is configured to interact with a virtual representation of system 620 to perform enhanced storage-related functions. For example, consider that enhanced port multiplier 630 executes non-SATA commands that concatenate storage drives 650 to appear as a single hard drive in a virtual representation of system 620. If host computing device sends a READ command to read data from an address, which is a virtual address, virtualization unit 638 and/or execution unit will map that virtual address to a physical address for a specific storage device to retrieve the requested data. In one embodiment, enhanced port multiplier 630 can operate—in whole or in part—as disclosed in U.S. Provisional Patent Application filed on Aug. 25, 2005 with title "Smart Scalable Storage Switch Architecture," and having an Application No. 60/711,863, the disclosure of which is incorporated by reference in its entirety.

In one embodiment, encryptor/decryptor 639 is configured to implement known encryption techniques to secure the data transfer over covert communication channel 606. For example, encryptor/decryptor 639 can implement public-key encryption in which a standard public key exchange takes place initially and a common session key is created. Then, encryptor/decryptor 639 can use the session key to encrypt and decrypt either the non-SATA message (or portions thereof) or the entire SATA packet associated with the non-SATA message. In some embodiments, enhanced port multiplier 630 includes a single substrate 690 upon which it is formed to produce a single chip enhanced port multiplier.

In various embodiments, covert communication channel 606 is either a bidirectional channel or a unidirectional channel, where unidirectional channels can either be a downlink from host computing device 602 to enhanced port multiplier 630 or an uplink from enhanced port multiplier 630 to host computing device 602. Note that when only an uplink is present, no flow control is needed. Enhanced port multiplier 630 responds to host computing device 602 at the rate the host makes requests. When only a downlink is present, host computing device 602 can potentially send messages at a faster rate than enhanced port multiplier 630 can process them. So when performing blind configuration operations (i.e., no feedback is provided as to whether message delivery was successful), some of the messages might be difficult to manage. As such, enhanced port multiplier 630 can selectably define a maximum request rate it can sustain, and host computing device can meter out its requests at the given rate to ensure that none are lost. When both an uplink and a downlink are present, synchronized flow control between the host and the agent can be achieved. Each message body can include a sequence number, such as that in field 526 of FIG. 5. When enhanced port multiplier 630 receives and executes a non-SATA message, it composes a SATA response message that reports the completion of processing for the non-SATA message with the given sequence number. Host computing device then can read the following SATA response messages until it determines that the non-SATA message was successfully executed or times out. If it times out, host computing device 602 can retransmit the message. If enhanced port multiplier 630 receives a SATA message with a duplicate sequence number, it can simply drop non-SATA response message (e.g., drop from field 528 in FIG. 5) and indicate that in the SATA response message 510 of FIG. 5.

In a specific embodiment, SATA command processor 634 is used to connect enhanced port multiplier 630 with another enhanced port multiplier 640, which is multiplexed among multiple storage devices 640. Accordingly, both enhanced port multipliers 630 and 640 and their respective storage devices 650 and 652 are accessible via a single port on host computing device 602. While both enhanced port multipliers 630 and 640 can be configured to snoop the same "READ" commands and compose the same messages, this can cause each to take duplicate action. This can be desirable in some situations, such as in the case of downloading the same configuration settings to each enhanced port multiplier. However, one might desire that enhanced port multipliers 630 and 640 be configured differently. To address this situation, the message body includes an identifier that uniquely specifies either enhanced port multiplier 630 or enhanced port multiplier 640. Each enhanced port multiplier verifies that the message includes its identifier (or broadcast indicator) before processing the message. The identifier can be any unique piece of information, such as a SATA serial number. A SATA response message can be used to return the unique identifier of the enhanced port multiplier as well as any other identifiers for other downstream enhanced port multipliers. Advantageously, the identifier disposed in the message body prevents host computing device 602 from unintentionally sending messages to unknown enhanced port multipliers.

In operation, SATA command processor 634 can route messages to or from any enhanced port multiplier or any other device. For example, once one enhanced port multiplier determines that it has received a valid message for another enhanced port multiplier, it can forward the message to all of its downstream links (using an appropriate set of READ commands), or it could maintain a routing table and forward the message down through one specific downstream link. SATA command processor 634 is configured to issue IDENTIFY DEVICE commands (or other comparable protocol-compliant commands) of its own to cause one or more downstream devices, such as enhanced port multiplier 640, to pass up response messages to the requester, such as host computing device 602. For example, consider that host computing device 602 has issued a number of READ command-based SATA packets for sending non-SATA message 610 to enhanced port multiplier 640, which then processes non-SATA message 610 to perform an enhanced storage-related function. Processing of non-SATA message 610 can relate to any storage device in the group of storage devices 652. Next, consider that enhanced port multiplier 640 generates a non-SATA response message for transmission via enhanced port multiplier 630 to host computing device 602. To do this, SATA command processor 634 issues a sufficient number of IDENTIFY DEVICE commands to cause the non-SATA response message to transmit from enhanced port multiplier 640 up to SATA transceiver 632. In turn, host computing device 602 issues a sufficient number of IDENTIFY DEVICE commands to cause the non-SATA response message to transmit from enhanced port multiplier 640 up to host computing device 602. Note that SATA transceiver 632 can receive the non-SATA response message into its message reply buffer after, for example, non-SATA response messages generated by SATA transceiver 632 are sent up to host computing device 602. In one embodiment, SATA-command processor 634 is configured to monitor and track the contents of IDENTIFY DEVICE responses received from enhanced port multiplier 640 for purposes of determining the number of IDENTIFY DEVICE commands it should issue to ensure that the non-SATA response message is conveyed up to SATA transceiver 632. For example, a marker flag could be used to indicate the first and/or last portion of a non-SATA response message. Note that host computing device 602 and SATA transceiver 632 can cooperate to implement any number of protocol-compliant messages in any manner to send non-SATA messages along covert communication channel 606, which extends along covert segment 699.

Figure 7:
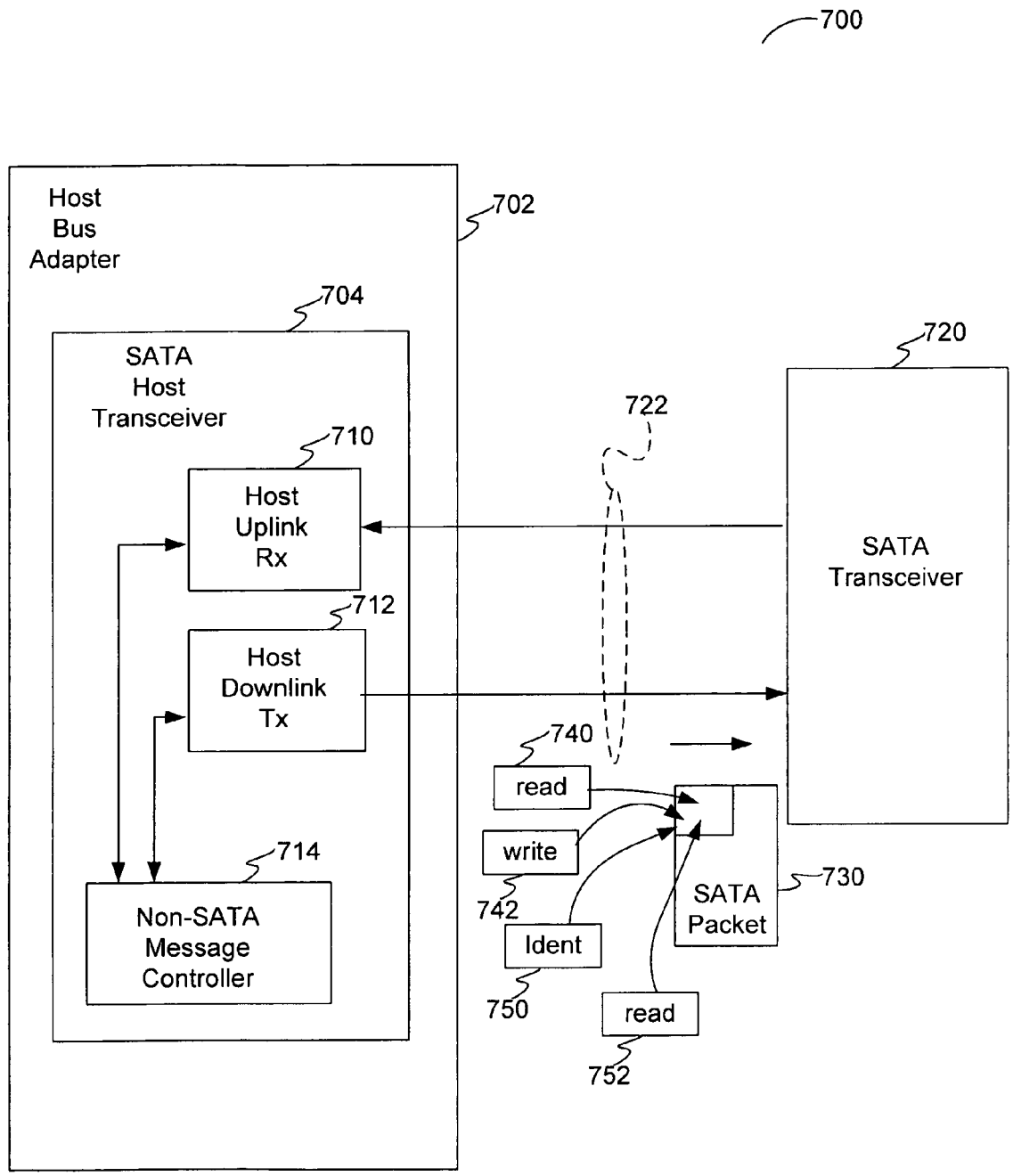
FIG. 7 depicts a SATA host transceiver to establish another terminus at a computing device for a covert communication channel, according to one embodiment of the invention.

FIG. 7 depicts a SATA host transceiver to establish a terminus at a host computing device for a covert communication channel, according to one embodiment of the invention. A host bus adapter 702 includes a SATA host transceiver 704 for establishing a covert communication channel with a SATA transceiver 720, which can reside at an enhanced port multiplier (not shown). SATA host transceiver 704 is transparent to the operating system and host processor (not shown) of the host computing device. While SATA host transceiver 704 operates in a manner similar to that of SATA transceiver 720, SATA host transceiver 704 includes a host uplink receiver ("Rx") 710 and a host downlink transmitter ("Tx") 712. It also includes a non-SATA message controller 714 for initiating non-SATA message transfers down covert communication channel in response to, for example, a request by an operating system and/or an application program of the host computing device. In one embodiment, SATA message controller 714 can split a non-SATA message into portions and associate each portion with an offset for receipt by SATA transceiver 720. Note that while FIG. 7 shows SATA host transceiver 704 being implemented in host bus adapter 702, SATA host transceiver 704 can be implemented anywhere within a host computing device in various other embodiments, such as in an applications program or in a hard disk controller chip. As such, the structure and/or functionality of SATA host transceiver 704 can be implemented in either software or hardware, or a combination thereof. Similarly, SATA transceiver 720 can be implemented in either software or hardware, or a combination thereof.

Host downlink transmitter 712 is operable to form at least a downlink of protocol-compliant link 722 by implementing a command that does not alter the downstream storage devices (not shown). As described above, the READ command is one such command that host downlink transmitter 712 can use to send non-SATA messages using protocol-compliant SATA packets 730. Notably, host downlink transmitter 712 operates to insert non-SATA messages (or portions thereof) into an address field of SATA 730 packet containing a READ command 740. In one embodiment, host downlink transmitter 712 inserts a portion of a non-SATA message and an offset into a LBA (not shown) of SATA packet 730. The LBA is a field that any non-privileged application program can use. Since the READ command itself is non-destructive, the contents of SATA packets 730 carrying non-SATA messages will not affect the contents of the storage devices.

Host downlink transmitter 712 can also operate to generate IDENTIFY DEVICE ("IDENT") commands 750 so that host uplink receiver ("Rx") 710 can receive SATA response messages from SATA transceiver 720, which can be disposed in an enhanced port multiplier or any downstream device. As described above, SATA response messages are modified (or synthesized) by an uplink inserter (not shown) of SATA transceiver 720 to include a non-SATA message (or a portion thereof). Host uplink receiver 710 can also include a structure and/or functionality similar to message composition buffer 420 of FIG. 4 to accumulate and recreate non-SATA response messages sent from the enhanced port multiplier or downstream device.

In various embodiments, host downlink transmitter 712 can implement other types of SATA commands in lieu of READ command 740 and IDENTIFY DEVICE command 750 for establishing covert communication channel 722. For example, a READ command 752—or more specifically, the SATA response to a READ command—can be used instead of IDENTIFY DEVICE command 750. The uplink transmitter (not shown) of SATA transceiver 720 then would be configured to detect READ response messages, and to insert non-SATA messages into the data stream for receipt by the host uplink receiver 710. SATA READ commands used for the purpose of requesting a non-SATA response message from a target can be distinguished from "normal" SATA commands. A technique used in some embodiments is the "high LBA" technique described below. In addition, other SATA commands can require safeguards to avoid the destruction of the data on the disks. For example, host downlink transmitter 712 can implement a WRITE command 742 as a substitute for a READ command to convey non-SATA messages along the downlink so long as sufficient safeguards are in place, such as a disk lock. Such a lock would prevent WRITE command 742 from either being misdirected or misinterpreted by a storage device that could cause inadvertent writes to a storage drive. WRITE command 742 then can be used in the same way the READ command is used. That is, an enhanced port multiplier or downstream device can eavesdrop on the LBA to acquire non-SATA message data.

The WRITE command can be used in a variety of ways. For example, WRITE command 742 can be used in accordance with a "high LBA" technique in which WRITE commands 742 are sent with addresses that are beyond the range supported by the storage devices. In this case, SATA transceiver 720 or a downstream device can eavesdrop to detect any high address that is beyond the end of the disk. While the address is considered "invalid" by the storage devices, the data accompanying the WRITE command can constitute the payload, or portion of a non-SATA message. But since not all hosts pass theses type of commands to the drives, a host computing device requires modification to pass this type of command on. So, the host computing device can be configured to pass on SATA packets including high LBAs, according to one embodiment. In another example, WRITE command 742 can be used in accordance with a "non-existent target" technique in which WRITE commands 742 are sent to fake or phantom storage devices. SATA transceiver 720 or any other device then eavesdrops on packets to detect those disk drive identifiers that are known to be phantom drives. But since the fake drive looks like a regular drive to end users, the host computing device should conceal the phantom drives. In one embodiment, the host computing device operates to mask phantom drives from end users.

Figure 8:
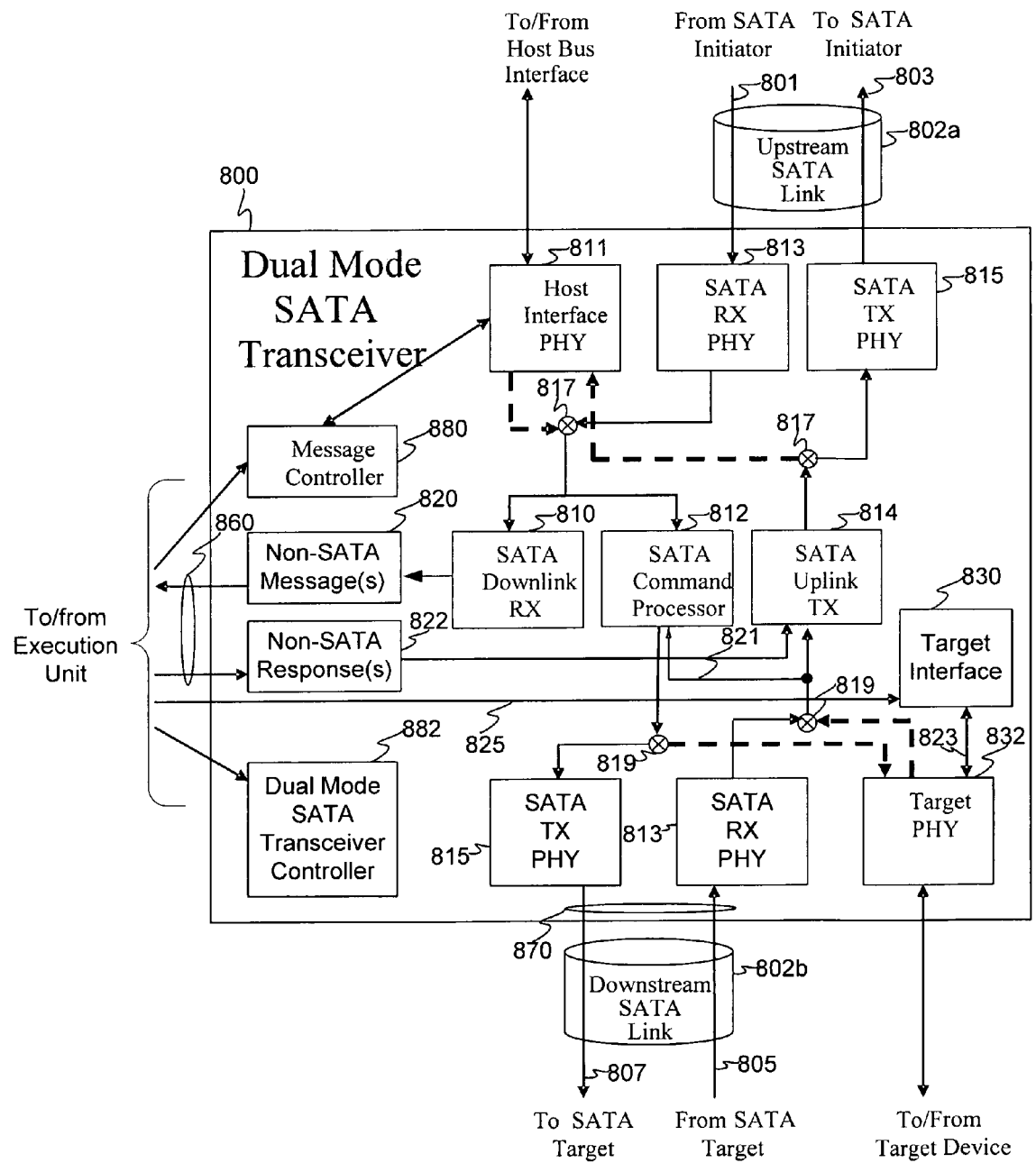
FIG. 8 is block diagram depicting a dual-mode SATA transceiver to operate as either an initiator or target of SATA packets, or both, according to one or more embodiments of the invention.

FIG. 8 is block diagram depicting a dual-mode SATA transceiver to operate as either an initiator or a target of SATA packets, or both, according to one or more embodiments of the invention. In a first mode, dual-mode SATA transceiver 800 is configured to operate as a SATA initiator for sending a data stream of SATA packets to a target. A target can be another SATA transceiver or any SATA-compliant device, such as a storage device. The target is usually located downstream from dual-mode SATA transceiver 800. In a second mode, dual-mode SATA transceiver 800 is configured to operate as an SATA target for receiving SATA packets from an initiator. An initiator can be another SATA transceiver or a SATA originator (not shown). As used herein, the term "SATA originator" refers generally to a host computing device or any other device located upstream from dual-mode SATA transceiver 800.

Dual-mode SATA transceiver 800 includes a SATA downlink receiver ("Rx") 810 and SATA uplink transmitter ("Tx") 814 for communicating non-SATA messages 820 and non-SATA response messages 822, respectively, via message port 860 with an execution unit (not shown) or any consumer/producer of non-SATA messages. Further, dual-mode SATA transceiver 800 can include a SATA command processor 812, which can perform various application-specific functions. In at least one embodiment, SATA command processor 812 is configured to generate IDENTIFY DEVICE command-based messages and send them to a SATA-compliant target to solicit responses for the IDENTIFY DEVICE command-based messages. These responses usually can include non-SATA response messages. Feedback signal 821 is fed into SATA command processor 812 to monitor and track the contents of IDENTIFY DEVICE responses received from a SATA target for transmission upstream. This helps SATA command processor 812 determine an appropriate set of IDENTIFY DEVICE commands to issue for receiving the non-SATA response messages.

SATA command processor 812 can also perform other functions, such as the following described application-specific functions. If the dual-mode SATA transceiver 800 is part of an enhanced port multiplier, then SATA command processor 812 can be configured to map SATA commands from virtual targets to physical targets. To illustrate, consider that a virtual target provides a virtual representation of two physical targets in a mirror set. In this case, when SATA command processor 812 receives a write command, it replicates that command to both physical devices. But if the virtual target represents a concatenation of three physical targets, SATA command processor 812 then can select the appropriate physical target referenced by a specific SATA command, based on address and length. SATA command processor 812 follows this selection by issuing modified commands to the physical targets.

Consider one example in which SATA command processor 812 is part of a simple port multiplier. In this case, SATA command processor 812 can select a particular physical target based on the SATA addressing bits and forward the command to the appropriate target, as defined in the SATA Port Multiplier specification maintained by the Serial ATA International Organization. In another example, consider that SATA command processor 812 is part of a SATA analyzer, which records SATA traffic based on patterns specified over the covert channel. Thus, SATA command processor 812 can operate to simply pass the SATA commands through to the appropriate physical target downstream without interpretation (i.e., without processing). In yet another example, consider that SATA command processor 812 is part of an enhanced disk controller. In this case, SATA command processor 812 can interpret the SATA command and interact with target interface 830 to directly manipulate a particular target device (e.g., by moving a head to access the location on the physical medium that was specified in the SATA command).

Dual-mode SATA transceiver 800 also includes a SATA receiver physical layer interface ("SATA RX PHY") 813 and a SATA transmitter physical layer interface ("SATA TX PHY") 815, both of which are used to interface SATA downlink receiver 810 and SATA uplink transmitter 814 for exchanging SATA messages with an upstream portion of a SATA link ("upstream SATA link") 802*a*. Specifically, SATA receiver physical layer interface 813 interfaces with upstream portion of a SATA link 802*a* to receive signals 801 from a SATA initiator (not shown), whereas SATA transmitter physical layer interface 815 interfaces with SATA link 802*a* to transmit SATA-compliant physical signals 803 to a SATA initiator. Note that another pair of SATA receiver physical layer interface 813 and SATA transmitter physical layer interface 815 can interface via a target port 870 with a downstream portion of a SATA link ("downstream SATA link") 802*b*, which sends SATA-compliant signals 807 to a target and receives SATA-compliant signals 805 from the target.

Further, dual-mode SATA transceiver 800 includes multiplexers 817 and 819. If no other intervening SATA transceiver exists between dual mode SATA transceiver 800, then multiplexer 817 can operate to exchange SATA packets (or FISes) along paths shown as dashed lines between a host physical layer interface ("PHY") 811 and any of SATA downlink receiver 810, SATA command processor 812 and SATA uplink transmitter 814. Or, multiplexer 817 can operate to exchange SATA packets (or FISes) along paths shown as solid lines between both SATA receiver 813 and SATA transmitter physical layer interfaces 815 and any of SATA downlink receiver 810, SATA command processor 812 and SATA uplink transmitter 814, if there are intervening upstream SATA initiators between a host and dual-mode SATA transceiver 800. In these cases, dual-mode SATA transceiver 800 operates in a second mode as a SATA target.

Multiplexers 819 operate in a similar manner to enable dual-mode SATA transceiver 800 to operate as a SATA initiator in a first mode. For example, multiplexer 819 can operate to exchange SATA packets (or FISes) via target physical layer interface ("PHY") 832 along paths shown as dashed lines. These paths extend between a target device (not shown) and any of SATA downlink receiver 810, SATA command processor 812 and SATA uplink transmitter 814, if no other intervening SATA targets exists between dual mode SATA transceiver 800 and the target device (not shown). Host physical layer interface 811 is configured to communicate with a bus protocol, such as PCI Express, to exchange information in SATA packets with a host processor/operation system (not shown). Target physical layer interface 832 is configured to communicate information in SATA packets with a specific target, such as storage drive.

Dual-mode SATA transceiver 800 includes a target interface 830 for operating in a first mode as a SATA initiator. In some cases, target interface 830 configures target physical layer interface 832 to receive non-SATA response messages from an end target device and then forward them to SATA uplink transmitter 814 for retransmission upstream. As used herein, the term "end target" is used in some embodiments to describe a target residing at the lowest level in an initiator-target hierarchy. It is at the lowest level at which target storage devices or other like SATA-compliant devices reside. Target interface 830 is configured to receive non-SATA messages 825 from the execution unit (not shown) and to generate control signals 823 for controlling the target device. For example, control signals 823 might upgrade a firmware version of hard drive controller, or it might change a storage-related policy.

In at least one embodiment, dual-mode SATA transceiver 800 includes a message controller 880 for controlling generation of non-SATA messages in response to commands on a host bus interface. A suitable message controller for implementing message controller 880 is that of a similar-named component (i.e., non-SATA message controller 714) shown in FIG. 7. In some embodiments, dual-mode SATA transceiver 800 includes a dual-mode SATA transceiver controller 882, which can support virtualization of a number of target drives. For example, dual-mode SATA transceiver controller 882 can maintain a mapping table linking a virtual target to one or more physical targets.

Figure 9:
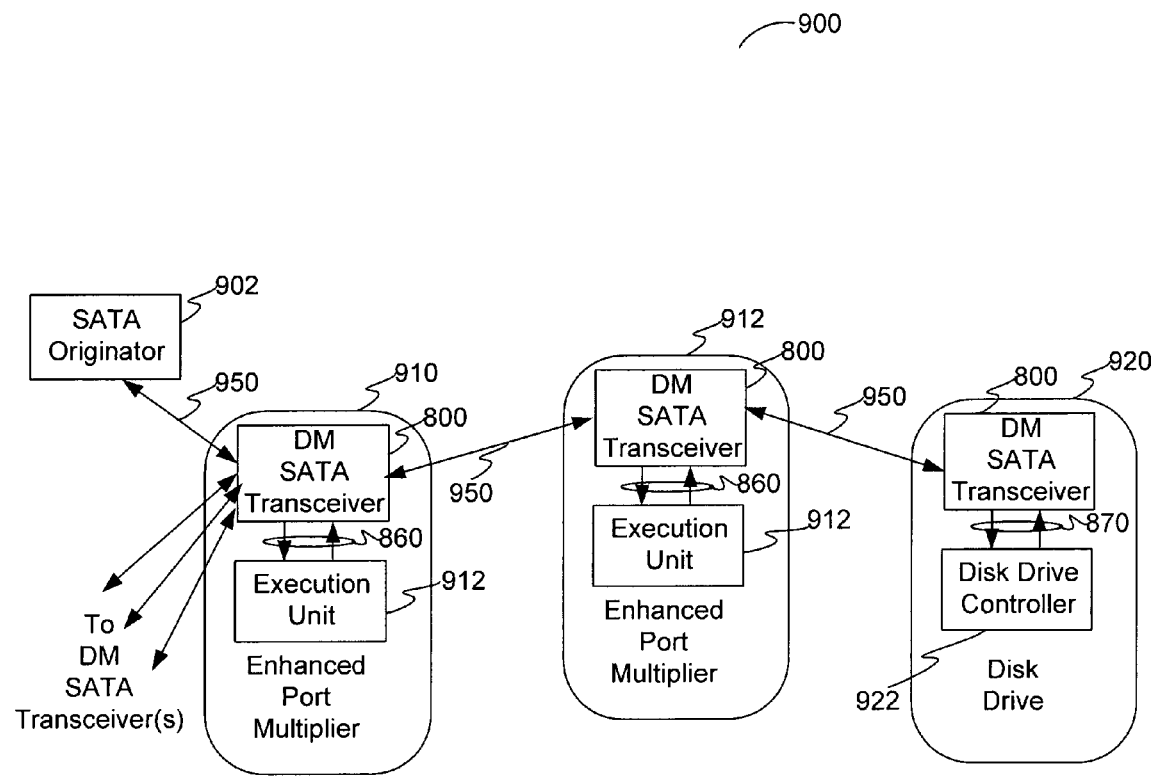
FIG. 9 is block diagram depicting an exemplary implementation of dual-mode SATA transceivers in an initiator-target hierarchy, according an embodiment of the invention.

FIG. 9 is block diagram 900 depicting an exemplary implementation of dual-mode SATA transceivers in an initiator-target hierarchy, according to an embodiment of the invention. Here, a SATA originator 902 (as initiator) is coupled to an enhanced port multiplier 910 (as target). A suitable originator for implementing SATA originator 902 is SATA host transceiver 704 of FIG. 7, according to at least one embodiment. Further to the initiator-target arrangement of FIG. 9, enhanced port multiplier 910 and enhanced port multiplier 912 are initiators for targets enhanced port multiplier 912 and disk drive 920, respectively. As such, covert path segments 950 extend between SATA originator 902 and disk drive 920 to form a covert communication channel. As shown, each of enhanced port multipliers 910 and 912 has a dual mode ("DM") SATA transceiver 800, as does disk drive 920. Disk drive 920 is considered the "end target" in the hierarchy shown. However, dual mode SATA transceivers 800 in both enhanced port multipliers 910 and 912 communicate via message ports 860 to execution units 912. By contrast, dual mode SATA transceiver 800 in disk drive 920 communicates via a target port 870 to communicate at the storage device-level. With the arrangement shown in FIG. 9, SATA originator 902 can pass non-SATA messages, such as proprietary storage instructions and data used by disk driver controller 922, via a covert communication channel to a disk drive controller 922 or the like. In one embodiment, dual mode SATA transceiver 800 in disk drive 920 is internal to disk drive 920, and in some cases, can be formed as part of disk drive controller 922. In other embodiments, dual mode SATA transceivers 800 can be formed within either a single-chip enhanced port multiplier or a single chip disk drive controller.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the invention to any embodiment; rather features and aspects of one embodiment may readily be interchanged with other embodiments. Although the above descriptions of the various embodiments relate to the SATA protocol and storage devices, the discussion is applicable to any type of communications protocol requiring an additional communication channel that the protocol does not provide. In addition, the uplink and downlink can be used independently and each in isolation. Further, while the various embodiments illustrate the use of address and vendor-specific fields, any other field can be used so long as the SATA protocol is not disrupted (or is negligibly disrupted, but without protocol violation) by the use of those other fields.

Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the invention; rather any specific embodiment can provide one or more of the advantages discussed above. It is intended that the following claims and their equivalents define the scope of the invention.

The invention claimed is:

1. A communication apparatus for conveying supplemental messages via a link between a host and a point within a system of storage devices, the communication apparatus comprising:
    a link interface configured to communicatively couple the communication apparatus to the link for accessing a data stream passing through the link in accordance with a standardized protocol; and
    a supplemental message interface configured to exchange a supplemental message with the data stream to establish a covert communication channel in the link, the supplemental message interface including a supplemental message observer configured to identify a supplemental downlink message in the data stream, the supplemental message observer including:
        a downlink receiver configured to:
            identify a portion of the supplemental downlink message, and
            acquire the portion of the supplemental downlink message, the downlink receiver being responsive to a first protocol-compliant message, and
        a supplemental message composition buffer configured to compose the supplemental downlink message from a number of portions of the supplemental downlink message;
    wherein the supplemental message supplements the standardized protocol.

2. The communication apparatus of claim 1, wherein the covert communication channel introduces the supplemental messages in the data stream such that the link maintains compliance with the standardized protocol.

3. The communication apparatus of claim 2, wherein the covert communication channel embeds the supplemental messages in the data stream without either altering protocol-compliant data of the data stream or accessing the system of storage devices to alter data stored therein, or both.

4. The communication apparatus of claim 1, wherein the supplemental message comprises a supplemental command configured to perform a storage-related function at a point within the system of storage devices, thereby performing the storage-related function downstream from the host.

5. The communication apparatus of claim 1, wherein the link is a serial link.

6. The communication apparatus of claim 1, wherein the supplemental message interface comprises a supplemental message interposer for interposing the supplemental message within the data stream.

7. The communication apparatus of claim 6, wherein the supplemental message interposer is configured to interpose portions of the supplemental message with portions of the data stream.

8. The communication apparatus of claim 6, wherein the supplemental message interposer comprises:
    an uplink transmitter configured to transmit a portion of a supplemental uplink message, the uplink transmitter being responsive to a second protocol-compliant message.

9. The communication apparatus of claim 8, wherein the second protocol-compliant message includes a non-write command that returns a response message.

10. The communication apparatus of claim 1 wherein the first protocol-compliant message includes a read command.

11. A supplemental message originator for use in a host computing device to establish a covert channel via a protocol-compliant link through which a data stream passes between the host computing device and a storage-related device in accordance with a protocol, the supplemental message originator comprising:
    a message controller configured to format a first message undefined by the protocol to generate a first formatted message for transmission over the protocol-compliant link;
    a host downlink transmitter configured to integrate the first formatted message into the data stream, thereby establishing at least a portion of a covert communication channel for conveying the formatted message via the protocol-compliant link; and
    a host uplink receiver configured to acquire a second formatted message undefined by the protocol, thereby establishing at least a second portion of the covert communication channel;
    wherein the covert communication channel facilitates transmissions of noncompliant messages over the protocol-compliant link in compliance with the protocol; and
    wherein the message controller is further configured to:
        detect other packets from the second portion of the covert communication channel, and
        reconstruct a second message from the second formatted message in the other packets.

12. The supplemental message originator of claim 11 wherein the message controller is further configured to:
    decompose the first message into portions of the first message;
    determine offsets for the portions of the first message, the portions of the first message and the offsets constituting the first formatted message; and
    include a portion of the first message and an offset in a packet of the portion of the covert communication channel.

13. The supplemental message originator of claim 12, wherein the packet further includes a READ command compliant with the protocol.

14. The supplemental message originator of claim 11, wherein the second packet further includes a response to an IDENTIFY DEVICE command compliant with the protocol.

15. A communication apparatus according to any one of claims 1, 2, 3, 4, 5, 6, 7, 8, 9, or 10, wherein the standardized protocol is Serial Advanced Technology Attachment ("SATA") protocol.

16. A supplemental message originator according to any one of claims 11, 12, 13, or 14, wherein the standardized protocol is Serial Advanced Technology Attachment ("SATA") protocol.

* * * * *